US010637615B2

(12) United States Patent
Sundararajan et al.

(10) Patent No.: US 10,637,615 B2
(45) Date of Patent: Apr. 28, 2020

(54) RETRANSMISSION INDICATION BASED ON AN ACKNOWLEDGEMENT BASED FEEDBACK SCHEME FOR WIRELESS COMMUNICATION

(71) Applicant: QUALCOMM Incorporated, San Diego, CA (US)

(72) Inventors: Jay Kumar Sundararajan, San Diego, CA (US); Sony Akkarakaran, Poway, CA (US); Jing Sun, San Diego, CA (US); Wanshi Chen, San Diego, CA (US); Hao Xu, Beijing (CN); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 15/939,054

(22) Filed: Mar. 28, 2018

(65) Prior Publication Data

US 2018/0287744 A1 Oct. 4, 2018

Related U.S. Application Data

(60) Provisional application No. 62/479,006, filed on Mar. 30, 2017.

(51) Int. Cl.
*G08C 25/02* (2006.01)
*H04L 1/18* (2006.01)
(Continued)

(52) U.S. Cl.
CPC .............. *H04L 1/1819* (2013.01); *H04L 1/14* (2013.01); *H04L 1/1635* (2013.01);
(Continued)

(58) Field of Classification Search
CPC ....... H04L 1/14; H04L 1/1635; H04L 1/1822; H04L 1/1819; H04L 1/1887;
(Continued)

(56) References Cited

U.S. PATENT DOCUMENTS

2009/0313516 A1 12/2009 Shin et al.
2016/0285589 A1* 9/2016 Mukkavilli ........... H04L 1/0041
(Continued)

FOREIGN PATENT DOCUMENTS

EP 3136671 A1 3/2017
WO 2016126653 A1 8/2016

OTHER PUBLICATIONS

Interdigital Communications: "Multi-Bits HARQ Feedback," 3GPP Draft, R1-1702379, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 12, 2017 (Feb. 12, 2017), XP051209533, pp. 1-3, Retrieved from the Internet: URL:http://www.3gpp.org/ftp/Meetings_3GPP_SYNC/RAN1/Docs/ (retrieved on Feb. 12, 2017).
(Continued)

*Primary Examiner* — Guerrier Merant
(74) *Attorney, Agent, or Firm* — Loza & Loza, LLP

(57) ABSTRACT

Aspects of the present disclosure provide various hybrid automatic repeat request (HARQ) retransmission indication schemes used in a HARQ retransmission process. The HARQ retransmission indication can implicitly or explicitly indicate which part of a transport block (TB), code block group(s), or code block(s) is/are being retransmitted so that the receiver can associate the retransmitted TB, code block group(s), code block(s) with the correct prior reception, for example, for HARQ combining purposes.

26 Claims, 13 Drawing Sheets

(51) Int. Cl.
*H04L 1/14* (2006.01)
*H04L 1/16* (2006.01)

(52) U.S. Cl.
CPC .......... *H04L 1/1816* (2013.01); *H04L 1/1822* (2013.01); *H04L 1/1887* (2013.01)

(58) Field of Classification Search
CPC ... H04L 1/1893; H04L 1/1861; H04L 1/1845; H04L 1/1816; H04L 1/1896; H04L 5/0055; H04L 1/1614; H04L 1/1812; H04W 72/042; H04W 72/0446; H04W 80/08; H04W 72/1273; H04W 76/27; H04W 72/14; H04W 84/042
See application file for complete search history.

(56) References Cited

U.S. PATENT DOCUMENTS

| | | | | |
|---|---|---|---|---|
| 2018/0145797 | A1* | 5/2018 | Yeo | H04L 1/1812 |
| 2018/0242315 | A1* | 8/2018 | Sun | H04W 72/0446 |
| 2018/0270022 | A1* | 9/2018 | Sun | H04L 1/1893 |
| 2018/0270023 | A1* | 9/2018 | Jiang | H04L 1/1819 |
| 2018/0270705 | A1* | 9/2018 | Sun | H04L 1/1657 |
| 2018/0287745 | A1* | 10/2018 | Sun | H04L 1/1864 |
| 2019/0058553 | A1* | 2/2019 | Sun | H04L 1/1812 |
| 2019/0074937 | A1* | 3/2019 | Bhattad | H04L 1/1819 |
| 2019/0181986 | A1* | 6/2019 | Kitamura | H04L 1/16 |
| 2019/0191486 | A1* | 6/2019 | Myung | H04W 80/08 |

OTHER PUBLICATIONS

International Search Report and Written Opinion—PCT/US2018/025091—ISA/EPO—dated Aug. 21, 2018.
Mediatek Inc: "On Multiple HARQ Bits per TB and Feedback Mechanism", 3GPP Draft; R1-1702738 on Multiple HARQ Bits per TB and Feedback Mechanism_Final, 3rd Generation Partnership Project (3gpp), Mobile Competence Centre; 650, Route Des Lucioles; F-06921 Sophia-Antipol, vol. RAN WG1, No. Athens, Greece; Feb. 13, 2017-Feb. 17, 2017, Feb. 12, 2017 (Feb. 12, 2017), 4 Pages, XP051209885, Retrieved from the Internet: URL: http://www.3gpp.org/ftp/Meetings_3GPP_SYNC/RAN1/Docs/ [retrieved on Feb. 12, 2017].

* cited by examiner

RETRANSMISSION INDICATION BASED ON AN ACKNOWLEDGEMENT BASED FEEDBACK SCHEME FOR WIRELESS COMMUNICATION

PRIORITY CLAIM

This application claims priority to and the benefit of U.S. provisional patent application No. 62/479,006 filed in the United States Patent and Trademark Office on Mar. 30, 2017, the entire content of which is incorporated herein by reference as if fully set forth below in its entirety and for all applicable purposes.

TECHNICAL FIELD

The technology discussed below relates generally to wireless communication systems, and more particularly, to retransmission indication based on an acknowledgement based feedback scheme for wireless communication.

INTRODUCTION

In wireless communication networks, a physical layer (PHY layer) receives payload data from an upper layer (e.g., MAC layer) as one or more transport blocks. The size of a transport block (TB) may be chosen based on various parameters. Different TB sizes may be used for different scenarios. For example, some of the parameters for determining TB size may include an amount of data available for transmission, modulation and coding scheme (MCS), and resources (e.g., time and frequency resources) available for transmitting the data. In some wireless networks, for example, Long-term Evolution (LTE), one TB may be transmitted as multiple time domain symbols (orthogonal frequency divisional multiplexing (OFDM) symbols) in a time slot. For transmission, a TB may be divided into smaller code blocks (CB), that are encoded with an error correcting block code to add redundancy to the information. Exploitation of this redundancy in the encoded information can improve the reliability of the message, enabling correction for any bit errors that may occur due to noise and/or interference during transmission. When one or more symbols is not successfully transmitted to a receiving device, the corresponding TB may be retransmitted using a hybrid automatic repeat request (HARQ) process that uses a combination of forward error-correcting coding and automatic repeat request (ARQ) error-control.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of wireless communication. A transmitter transmits a transport block (TB) to a receiver, and the TB includes a plurality of code blocks (CBs) grouped into a plurality of code block groups (CBGs). The transceiver receives a hybrid automatic repeat request (HARQ) feedback from the receiver based on a predetermined HARQ feedback scheme. The HARQ feedback is configured to indicate a reception error of one or more CBGs of the TB. The transceiver determines a retransmission indication mechanism based on the predetermined HARQ feedback scheme. The transceiver transmits a retransmission indication to identify one or more of the CBs based on the retransmission indication mechanism and retransmits the one or more CBs based on the HARQ feedback.

Another aspect of the present disclosure provides a method of wireless communication. A receiver receives a transmission including a transport block (TB). The TB includes a plurality of code blocks (CBs) grouped into a plurality of code block groups (CBGs). The receiver decodes the transmission to recover the TB. The receiver transmits a hybrid automatic repeat request (HARQ) feedback that indicates one or more CBGs with reception error. The receiver receives a retransmission indication that identifies one or more CBs in the one or more CBGs with reception error, and receives a HARQ retransmission including the one or more CBs identified by the retransmission indication.

Another aspect of the present disclosure provides an apparatus for wireless communication. The apparatus has a communication interface, a memory, and a processor operatively coupled with the communication interface and the memory. The processor and the memory are configured to transmit a TB to a receiver. The TB includes a plurality of CBs grouped into a plurality of CBGs. The processor and the memory are configured to receive a HARQ feedback from the receiver based on a predetermined HARQ feedback scheme, and the HARQ feedback is configured to indicate a reception error of one or more CBGs of the TB. The processor and the memory are configured to determine a retransmission indication mechanism based on the predetermined HARQ feedback scheme. The processor and the memory are configured to transmit a retransmission indication to identify one or more of the CBs based on the retransmission indication mechanism. The processor and the memory are configured to retransmit the one or more CBs based on the HARQ feedback.

Another aspect of the present disclosure provides an apparatus for wireless communication. The apparatus includes a communication interface, a memory, and a processor operatively coupled with the communication interface and the memory. The processor and the memory are configured to receive a transmission including a TB, and the TB includes a plurality of CBs grouped into a plurality of CBGs. The processor and the memory are configured to decode the transmission to recover the TB. The processor and the memory are configured to transmit a HARQ feedback that indicates one or more CBGs with reception error. The processor and the memory are configured to receive a retransmission indication that identifies one or more CBs in the one or more CBGs with reception error. The processor and the memory are configured to receive a HARQ retransmission including the one or more CBs identified by the retransmission indication.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
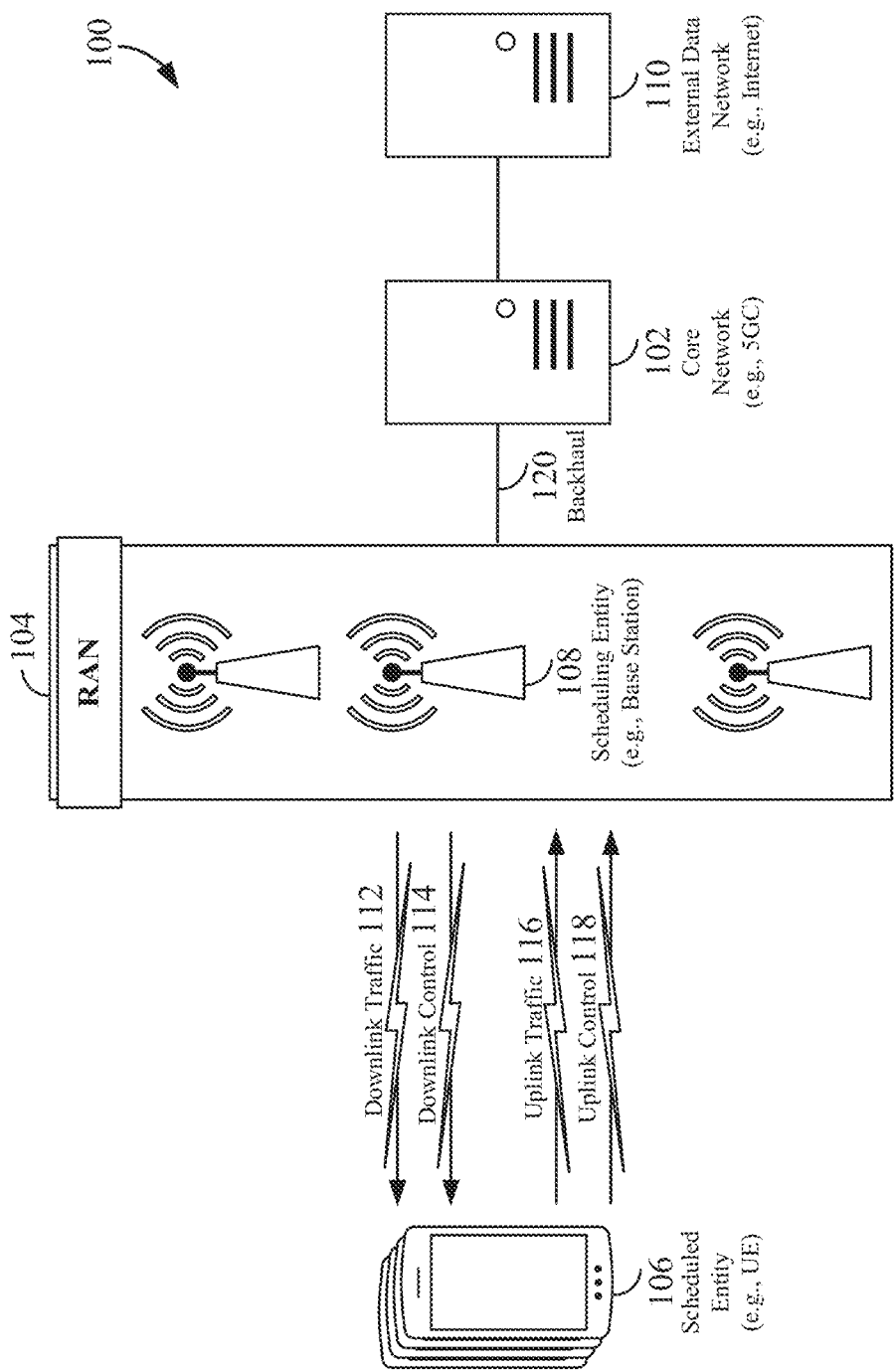
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a wireless communication network, a transport block (TB) may include multiple code blocks (CBs) that can be grouped into a number of code block groups (CBGs). In a next generation 5G new radio (NR) network, a data retransmission process (e.g., a hybrid automatic repeat request (HARQ) process) may be performed based on CBs, CBGs, TB, or a combination thereof. In some aspects of the present disclosure, a receiver may transmit HARQ feedback for a TB, CBGs, or CBs.

To reduce the overhead associated with the HARQ feedback, a CBG-based HARQ feedback scheme may be used in which a receiver may transmit an acknowledgment (ACK) or negative acknowledgment (NACK) to indicate that a particular CBG is successfully received (i.e., ACK'ed CBG) or needs to be retransmitted (i.e., NACK'ed CBG). The receiver may transmit a CBG-based HARQ feedback (e.g., an ACK or NACK) for each CBG included in a TB. In this case, an ACK indicates that all the CBs in that CBG were successfully received and decoded, but a NACK indicates that one or more CBs in that CBG were not received. The transmitter can use the HARQ feedback to determine which CB(s) or CBG(s) to retransmit. Therefore, the transmitter can retransmit only a portion of the original TB. Performing data retransmission at the CB or CBG level can provide a balance between retransmission feedback overhead and retransmission efficiency. In one example, CBs in an ACK'ed CBG are not retransmitted, hence bandwidth can be saved. By retransmitting only the affected CB or CBG, retransmission efficiency may be increased.

Aspects of the present disclosure provide various HARQ retransmission indication schemes used in a HARQ retransmission process. The HARQ retransmission indication can implicitly or explicitly indicate which part of a TB, CBG(s), or CB(s) is/are being retransmitted so that the receiver can associate the retransmitted TB/CBG(s)/CB(s) with the correct prior reception, for example, for HARQ combining purposes.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. The downlink traffic 112 and uplink traffic 116 may carry data in the form of one or more TBs. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
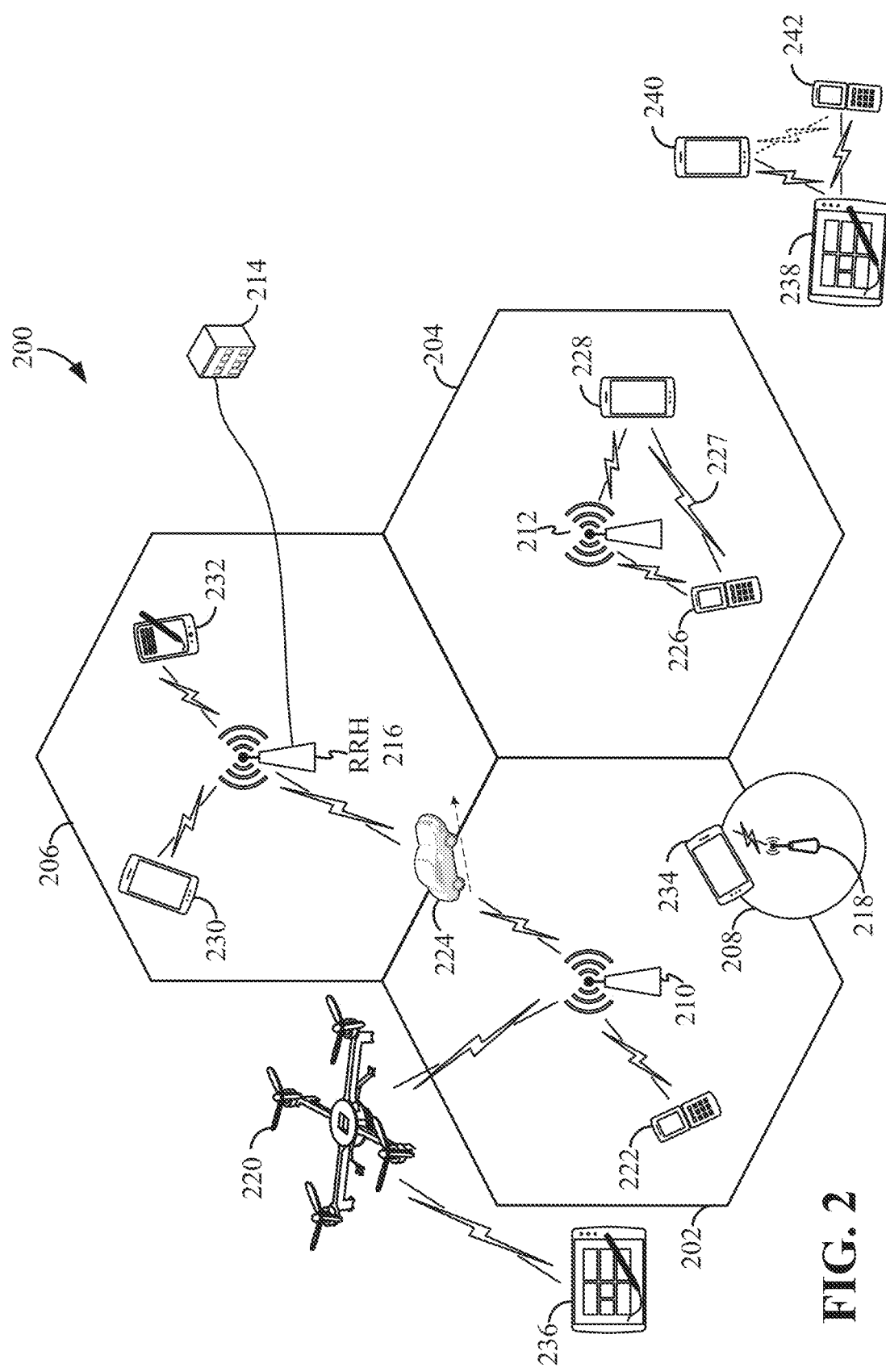
FIG. 2 is a conceptual illustration of an example of a radio access network.

FIG. 2 is a conceptual illustration of an example of a radio access network. Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. The UEs and base stations may use a HARQ retransmission process to retransmit a TB, CB(s), or CBG(s).

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224

(illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Figure 3:
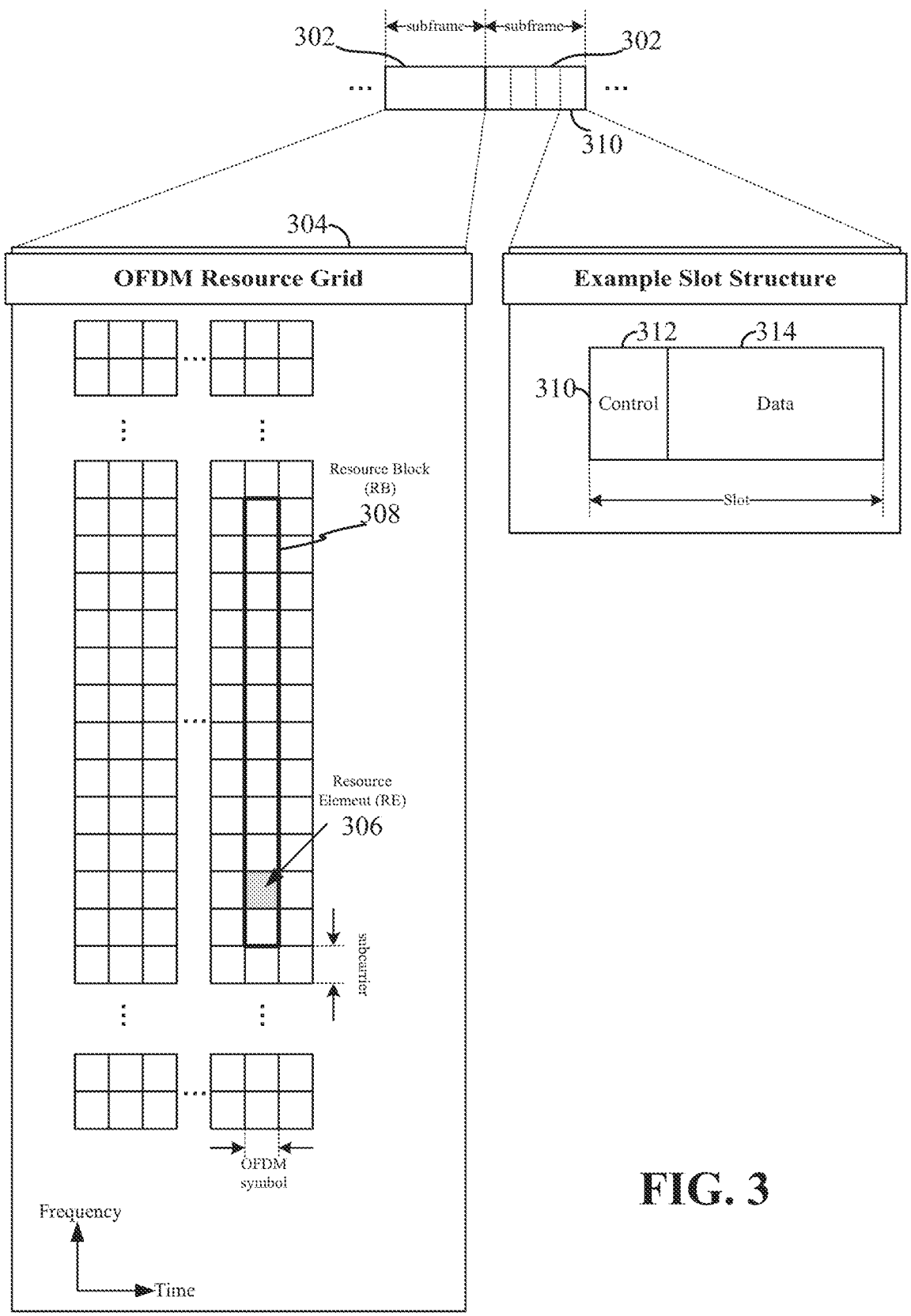
FIG. 3 is a schematic illustration of an organization of wireless resources in an air interface utilizing orthogonal frequency divisional multiplexing (OFDM).

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFUM link for clarity, it should be understood that the same principles may be applied as well to DFT-s-OFDMA waveforms.

Within the present disclosure, a frame refers to a duration of predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks. A transport block (TB) has a transport block size (TBS), which may correspond to a number of bits of information, may be a controlled parameter, based on the modulation and coding scheme (MCS) and the number of RBs in a given transmission.

Figure 4:
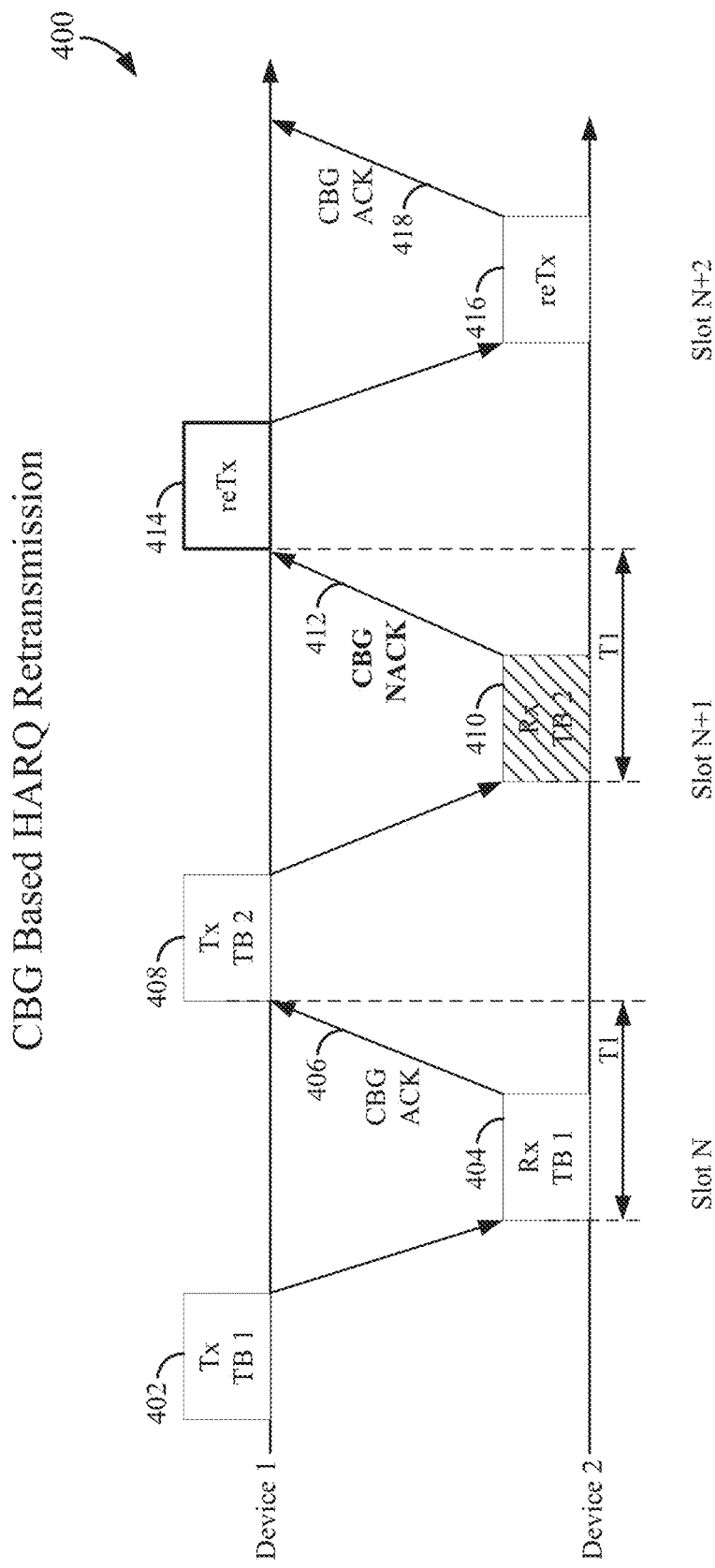
FIG. 4 is a diagram illustrating an exemplary a hybrid automatic repeat request (HARQ) retransmission process according to some aspects of the disclosure.
Figure 5:
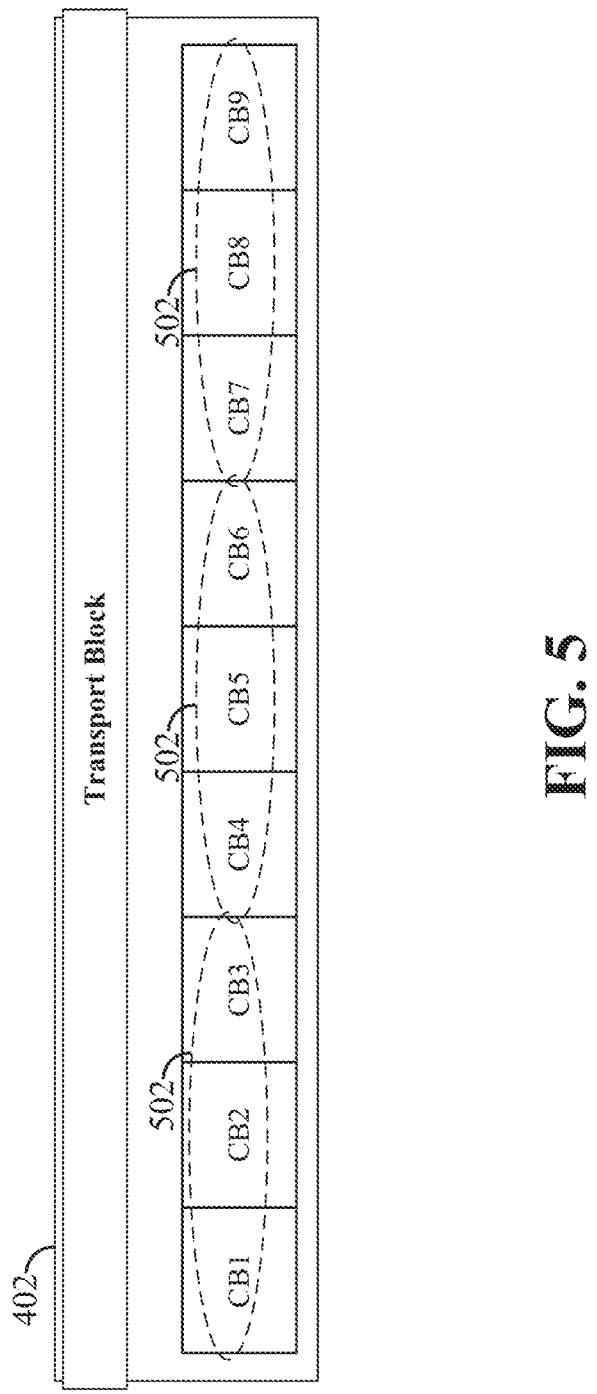
FIG. 5 is a diagram illustrating an exemplary transport block.

FIG. 4 is a diagram illustrating an exemplary CBG-based HARQ retransmission process 400 according to some aspects of the disclosure. This CBG-based HARQ retransmission process 400 may be performed by any of the scheduling entities and/or scheduled entities illustrated in FIGS. 1, 2, 6, 7, 9, and 10. A transmitting device (e.g., device 1) may transmit a first transport block (TB) 402 to a receiving device (e.g., device 2). The CBs of the first TB 402 may be grouped into one or more CBGs. Referring to FIG. 5, the TB 402 may be divided into a plurality of CBs (e.g., CB1, CB2, CB3, . . . CB9 are illustrated in FIG. 5). In other examples, the TB 402 may have more or fewer CBs. The CBs may be grouped into different CBGs 502 (e.g., three CBGs are shown in FIG. 5). In some examples, a CBG may include any number of CBs in a TB. Different CBGs may have different number of CBs.

In one example, the transmitting device may be a base station or scheduling entity, and the receiving device may be a UE or scheduled entity. In another example, the transmitting device may be a UE, and the receiving device may be a scheduling entity. In a DL example, the first TB 402 may be DL data (e.g., PDSCH packet). If all CBs of the first TB 404 are correctly received, the receiving device may transmit a CBG based HARQ feedback (e.g., a CBG ACK 406 is illustrated in FIG. 4) for each CBG. The time delay (T1) between the reception of the data and the transmission of the HARQ feedback (ACK or NACK) may be within the same slot (e.g., slot N in FIG. 4) or next one or more slots (e.g., slot N+1 or slot N+2).

After receiving the CBG ACK 406, the transmitting device may transmit a second TB 408 to the receiving device. Like the first TB, the second TB 408 may have one or more CBGs. If any CB of the second TB 410 is not successfully received and/or decoded, the receiving device (device 2) may transmit a NACK (e.g., a CBG NACK 412 is illustrated in FIG. 4) for each CBG containing one or more CBs that are not successfully received by the receiver. The transmitter does not need to retransmit CB(s) contained in an ACK'ed CBG. In response to each CBG NACK 412, the transmitting device may retransmit the CBs (illustrated as reTx 414 in FIG. 4) of the NACK'ed CBG. If the retransmitted CB(s) or CBG (e.g., illustrated as reTx 416 in FIG. 4) is correctly received, the receiving device may transmit a CB G ACK 418 to notify the transmitting device.

However, the receiver cannot assume that all the CBs of a NACK'ed CBG are retransmitted. In one scenario, the transmitter may not have received the HARQ feedback (e.g., ACK or NACK) at all due to various reasons such as feedback channel reliability or interference. In another scenario, the HARQ feedback may be corrupted during transmission. In another example, even if a CBG NACK was received correctly by the transmitter, the transmitter may retransmit only some CBs of a NACK'ed CBG because some CBs may have expired, and/or the transmitter may not have the needed resources (e.g., time and/or frequency resources, power, etc.) to retransmit all the CBs. In that case, the transmitter needs to indicate which CB(s)/CBG(s) of a transport block (TB) are retransmitted so that the receiver can correctly combine the retransmitted data with the prior reception, for example, for HARQ combining purposes.

Aspects of the present disclosure provide a retransmission indication mechanism for indicating the retransmitted data based on a HARQ feedback scheme utilized by the receiver. The retransmission indication mechanism enables a receiver to identify the CBs/CBGs in a HARQ retransmission. In a 5G NR network, a base station (e.g., eNB, gNB) can communicate with UEs or scheduled entities configured with different HARQ feedback schemes. A HARQ feedback scheme refers to how the receiver uses a HARQ feedback to notify the transmitter about the reception status (e.g., ACK or NACK) of the data (e.g., CBs, CBGs, or TB) transmitted by the transmitter. For example, some devices may use a CBG based HARQ scheme, while some devices may acknowledge (e.g., ACK or NACK) the entire TB in the HARQ feedback. Based on a receiver's particular HARQ feedback scheme, the transmitter may determine or choose the retransmission indication mechanism for indicating or identifying the CBs, CBGs, or TB in a HARQ retransmission. The concept may also be adapted to be used in UL and DL retransmissions.

In one aspect of the disclosure, the receiver may transmit a 1-bit HARQ feedback for the entire transport block (TB). In this case, the receiver can use the 1-bit HARQ feedback indicate whether the receiver can receive an entire TB successfully or not. In response to a 1-bit NACK, the transmitter can retransmit the entire TB and identify the retransmitted TB by a HARQ process index and new data indicator.

Figure 6:
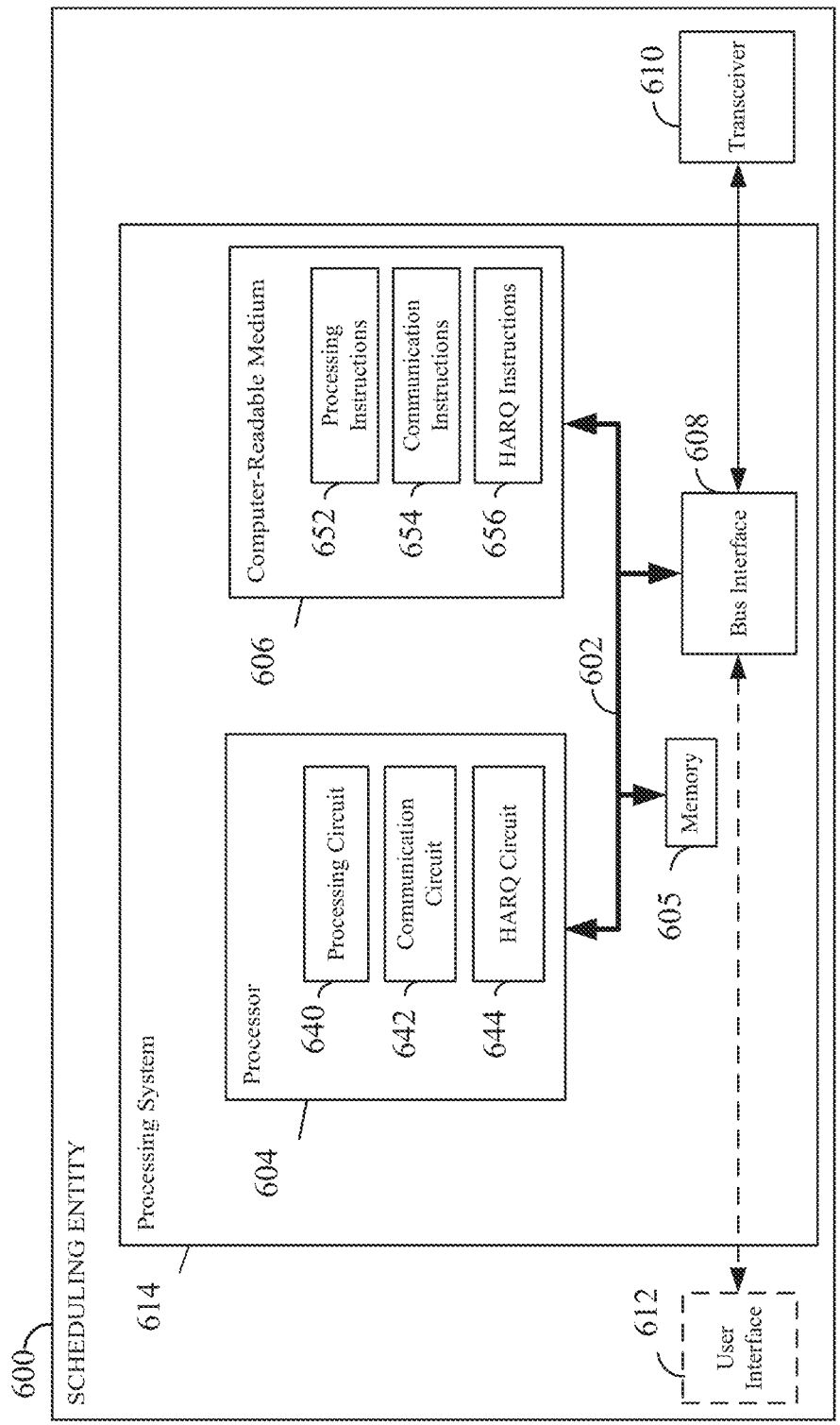
FIG. 6 is a block diagram conceptually illustrating an example of a hardware implementation for a scheduling entity according to some aspects of the disclosure.

FIG. 6 is a block diagram illustrating an example of a hardware implementation for a scheduling entity 600 employing a processing system 614. For example, the scheduling entity 600 may be a user equipment (UE) as illustrated in any one or more of FIGS. 1, 2, 9, and/or 10. In another example, the scheduling entity 600 may be a base station as illustrated in any one or more of FIGS. 1, 2, 9, and/or 10.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes and procedures described below and illustrated in FIGS. 8-13.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. Of course, such a user interface 612 is optional, and may be omitted in some examples, such as a base station.

In some aspects of the disclosure, the processor 604 may include circuitry (e.g., a processing circuit 640, a communication circuit 642, and a HARQ circuit 644) configured for various functions, including, for example, HARQ retransmission and indication as described in this disclosure. For example, the HARQ circuit 644 may be configured to implement one or more of the HARQ retransmission indication functions and processed described below in relation to FIGS. 8-13.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include software (e.g., processing instructions 652, communication instructions 654, and HARQ instructions 656) configured for various functions, including, for example, HARQ retransmission indication. In some examples, the software may be configured to implement one or more of the functions described in relation to FIGS. 8-13.

Figure 7:
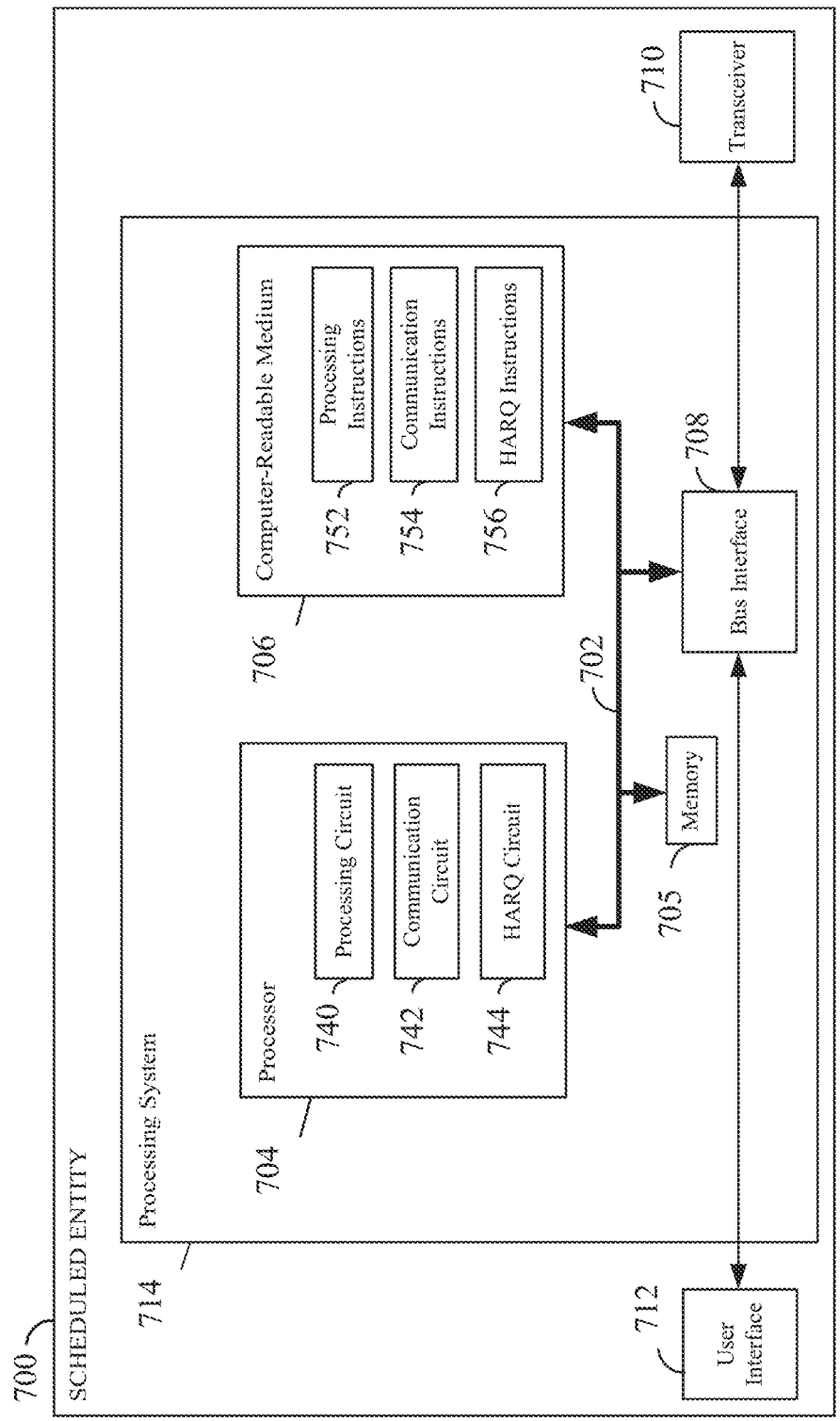
FIG. 7 is a block diagram conceptually illustrating an example of a hardware implementation for a scheduled entity according to some aspects of the disclosure.

FIG. 7 is a conceptual diagram illustrating an example of a hardware implementation for an exemplary scheduled entity 700 employing a processing system 714. In accordance with various aspects of the disclosure, an element, or any portion of an element, or any combination of elements may be implemented with a processing system 714 that includes one or more processors 704. For example, the scheduled entity 700 may be a user equipment (UE) as illustrated in any one or more of FIGS. 1, 2, 9, and/or 10.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6. That is, the processor 704, as utilized in a scheduled entity 700, may be used to implement any one or more of the processes described in relation to FIGS. 8-13.

In some aspects of the disclosure, the processor 704 may include circuitry (e.g., a processing circuit 740, a communication circuit 742, and a HARQ circuit 744) configured for various functions, including, for example, HARQ retransmission indication. For example, the circuitry may be configured to implement one or more of the functions described below in relation to FIGS. 8-13. In one or more examples, the computer-readable storage medium 706 may include software (e.g., processing instructions 752, communication instructions 754, and HARQ instructions 756) configured for various functions, including, for example, HARQ retransmission. For example, the software may be configured to implement one or more of the functions described above in relation to FIGS. 8-13.

Figure 8:
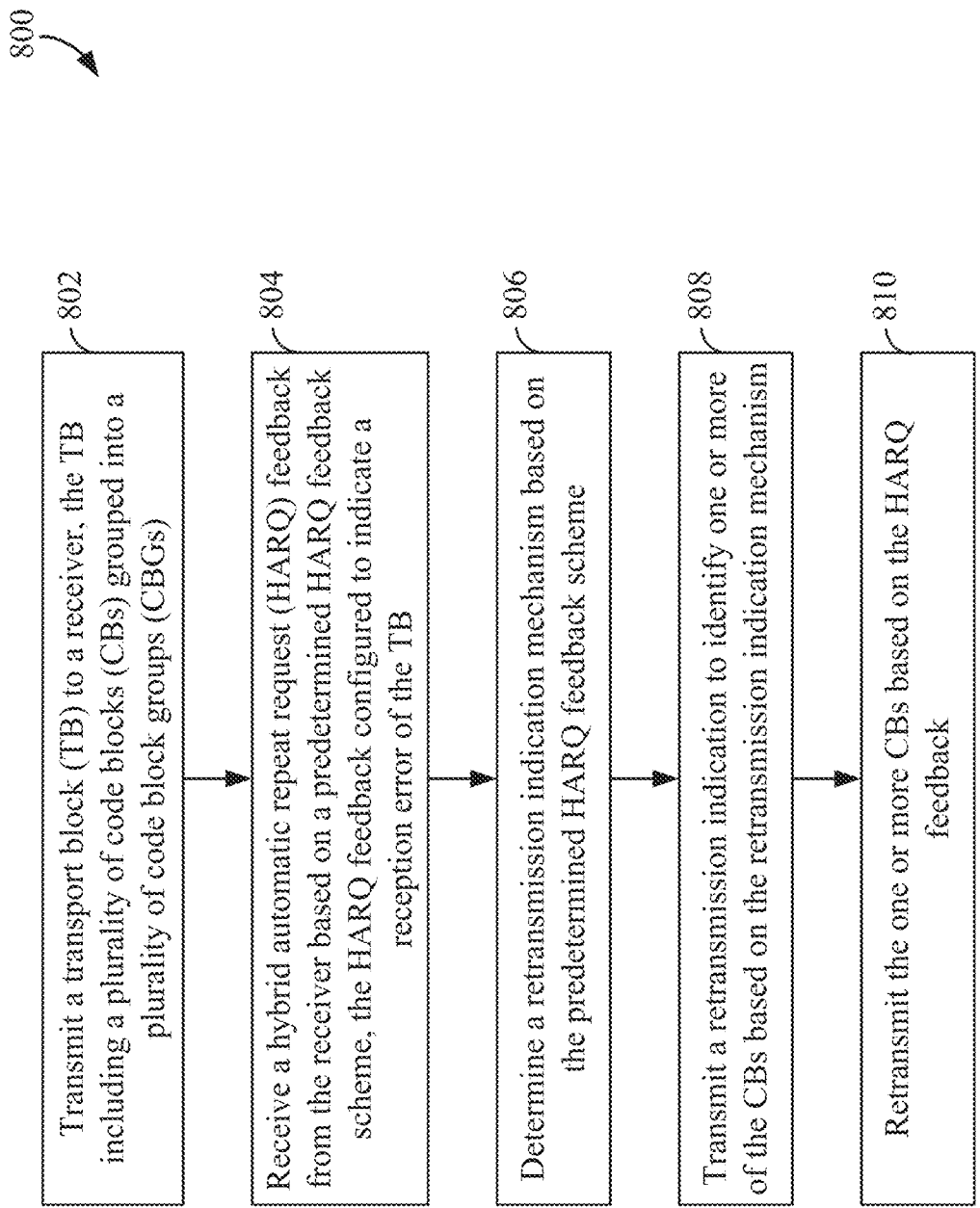
FIG. 8 is a flow chart illustrating an exemplary HARQ retransmission process operable at a transmitter according to some aspects of the disclosure.

FIG. 8 is a flow chart illustrating an exemplary HARQ retransmission process 800 according to some aspects of the disclosure. In some examples, the process 800 may be carried out by the scheduling entity or scheduled entity illustrated in FIGS. 1, 2, 6, 7, 9, and/or 10. In some examples, the process 800 may be carried out by any suitable apparatus or means for carrying out the functions, procedures, processes, or algorithm described below.

At block 802, a transmitter transmits a transport block (TB) to a receiver. The TB includes a plurality of code blocks (CBs) that are grouped into a plurality of CBGs. In one example, the transmitter may be a scheduling entity (e.g., gNB), and the receiver may be a scheduled entity (e.g., UE). In another example, the transmitter may be a scheduled entity (e.g., UE), and the receiver may be a scheduling entity (e.g., gNB). In one aspect of the disclosure, the transmitter may use the communication circuit 640/740 to transmit the TB in a DL channel (e.g., PDSCH) or UL channel (e.g., PUSCH). In a DL example, the TB may be the TB 906/1006 shown in FIG. 9 or 10.

At block 804, the transmitter receives a hybrid automatic repeat request (HARQ) feedback from the receiver based on a predetermined HARQ feedback scheme. The HARQ feedback indicates a reception error of the TB. In one example, with reference to FIG. 9, the HARQ feedback scheme may use a single bit HARQ feedback 908 to indicate that the TB is received successfully (ACK) or not (NACK). In another example, with reference to FIG. 10, the HARQ feedback scheme may use a multi-bit HARQ feedback 1008 to indicate that one or more CB(s) or CBG(s) is/are received successfully or not (e.g., CBG based ACK or NACK). The transmitter may use the communication circuit 640/740 to receive the HARQ feedback. In some aspects of the disclosure, the predetermined HARQ feedback scheme may be configured using a semi-static mechanism, for example, a radio resource configuration (RRC) process or the like. In other examples, the receiver may use any of the HARQ feedback schemes described in this disclosure.

At block 806, the transmitter determines a retransmission indication mechanism based on the predetermined HARQ feedback scheme. For example, the transmitter uses the retransmission indication mechanism to identify the CBs or CBGs that are retransmitted so that the receiver can identify the retransmitted CBs/CBGs. The transmitter may use the HARQ circuit 644/744 to determine the retransmission indication mechanism. In one example, if the receiver uses a single bit HARQ feedback 908 (see FIG. 9), the retransmission indication mechanism only needs to indicate whether or not the next transmission is a retransmission. In another example, if the receiver uses a multi-bit HARQ feedback 1008 (see FIG. 10), the retransmission indication mechanism can indicate a portion (e.g., CB(s)/CBG(s)) of the TB that is retransmitted.

At block 808, the transmitter transmits a retransmission indication to identify one or more CBs based on the retransmission indication mechanism. The transmitter may use the communication circuit 642/742 to transmit the retransmission indication to the receiver. In one example, the retransmission indication may indicate whether or not the next transmission is a retransmission of the entire TB or not. In another example, the retransmission indication may indicate one or more CBs of the TB that are retransmitted. In one DL example, the transmitter may transmit the retransmission indication in a PDCCH (e.g., DCI). In an UL example, the transmitter may transmit the retransmission indication in a PUCCH (e.g., UCI). In one example, the transmitter may transmit the retransmission indication utilizing a compression scheme that is different from a compression scheme of the HARQ feedback. The compression scheme refers to how data bits are used to represent the CBs or CBGs. When no compression is used, each bit may represent one CB. When compression is used, multiple bits may be encoded to represent multiple CBs. Higher compression can use fewer bits to represent a certain number of CBs than a lower compression.

In one example using no compression, the retransmission indication may be a bitmap or the like with one bit representing one CB to indicate whether the corresponding CB is retransmitted or not. In other examples, other data structures may be used instead of a bitmap. In another example, the transmitter may retransmit all CBs of a CBG that needs to be retransmitted (i.e., NACK'ed CBG). In this case, the retransmission indication may identify the CBG(s) retransmitted. In another example, the retransmission indicator may include a predetermined value that uniquely identifies the retransmitted CBG. For example, the predetermined value may be a CBG index or number of a previously transmitted CBG that is known to the receiver.

In one aspect of the disclosure, the transmitter may retransmit only some CBs of a NACK'ed CBG. In one example, the retransmission indication may be an indicator that identifies the particular CB(s) retransmitted. In another example, the transmitter may determine the CBs for retransmission based on some predetermined rules that are known to both the receiver and transmitter. In that case, the transmitter may not transmit an indicator to explicitly identify the retransmitted CBs because the receiver can determine the retransmitted CBs based on the same rules and the HARQ feedback. In one example, the transmitter and receiver may both know or agree on the maximum number of HARQ attempts allowed for any CB. In this case, the predetermined rule may be that the transmitter retransmits all CBs of a NACK'ed CBG that have not reached the maximum number of HARQ attempts. In another example, in situations where a CB may be part of more than one CBG, the predetermined rule may be that the transmitter retransmits a CB if and only if it is not a part of any ACK'ed CBG. In particular, if a CB is part of a NACK'ed CBG as well as an ACK'ed CBG, then that CB is not retransmitted because the ACK'ed CBG's ACK indicates successful reception of the CB. Assuming that the HARQ feedback sent by the receiver is reliably received by the transmitter, then the transmitter and the receiver may apply such predetermined rules to identify which CBs are retransmitted.

Figure 11:
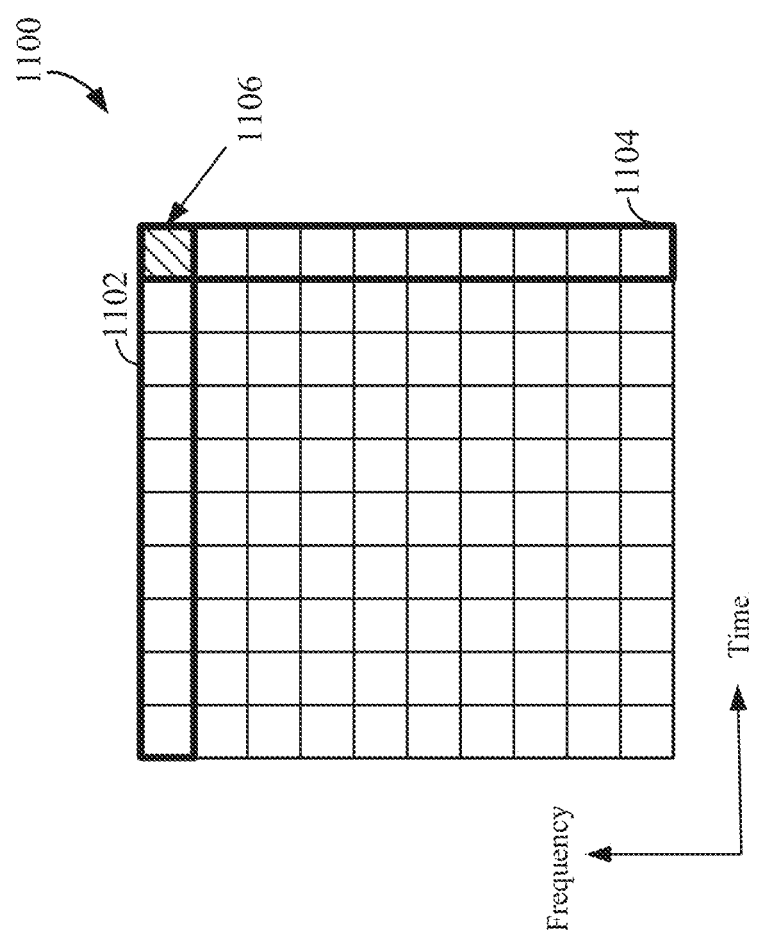
FIG. 11 is a diagram conceptually illustrating a CBG definition for wireless communication according to some aspects of the disclosure.

FIG. 11 is a diagram conceptually illustrating a CBG definition 1100 for wireless communication according to some aspects of the disclosure. In FIG. 11, a plurality of CBs are arranged in a grid format. In this example, 100 CBs (i.e., each square representing one CB) are illustrated in FIG. 11. In this example, the horizontal direction of the grid corresponds to the time domain, and the vertical direction corresponds to the frequency domain. In one aspect of the disclosure, a row of CB may belong to a first CBG 1102, and a column of CBs may belong to a second CBG 1104 that overlaps the first CBG 1102.

With this CBG definition, the receiver may transmit a CBG-based HARQ feedback (e.g., HARQ feedback 1008) that includes an ACK for the first CBG 1102, and a NACK for the second CBG 1104. When the transmitter retransmits data based on this CBG HARQ feedback, the transmitter may transmit all the CBs of the second CBG 1104 except the CB 1106 that is also included in the ACK'ed first CBG 1102. It is because the transmitter already received an ACK for the first CBG 1102 and concluded that CB 1106 was successfully decoded by the receiver. In this example, the transmitter can use a retransmission indication mechanism that provides no explicit indicator to identify the retransmitted CBs. Instead, the transmitter can rely on a predetermined rule to determine which CBs to retransmit based on the CBG definition and ACK/NACK received for the CBGs, and the receiver can determine the retransmitted CBs based on the same rule and the ACK/NACK transmitted. As an example, the predetermined rule may be that the transmitter retransmits a CB if and only if it is not a part of any ACK'ed CBG. FIG. 11 is only one example of CBG definition that may be implemented. In other aspects of the disclosure, other CBG definitions and rules for identifying the retransmitted CBs based on the CBG ACK/NACK feedback scheme may be used.

Referring back to FIG. 8, at block 810, the transmitter may use the communication circuit 642/742 to retransmit the one or more CBs based on the HARQ feedback. The one or more CBs may be identified by the retransmission indication so that the receiver can determine which CBs are retransmitted. In some aspects of the disclosure, the transmitter can dynamically adapt its retransmission indication based on the HARQ feedback scheme used by different receivers (e.g., UEs). In one example, if the receiver transmits a single bit NACK (e.g., HARQ feedback 908 of FIG. 9), the transmitter retransmits the entire TB in a TB based HARQ retransmission 910. In another example, if the receiver transmits a multi-bit NACK (e.g., HARQ feedback 1008 of FIG. 10), the transmitter retransmits one or more CBs or CBGs identified by the multi-bit NACK. The transmitter may use different HARQ retransmission indication mechanisms or schemes for different receivers.

In some aspects of the disclosure, the ACK/NACK data (i.e., HARQ feedback) used to generate the retransmission may be echoed back to the receiver. In one example, the ACK/NACK data may be corrupted during transmission and/or not received by the transmitter. Therefore, the transmitter may echo the ACK/NACK data (e.g., HARQ feedback echo 1012 of FIG. 10) back to the receiver such that the receiver can determine and confirm whether the transmitter is using the correct ACK/NACK data to generate the HARQ retransmission and/or indication. Additionally, in order to identify the retransmitted CBs, the receiver may use the echoed ACK/NACK data (in place of the transmitted ACK/NACK data) in conjunction with the predetermined rules used by the transmitter to generate the retransmission.

In some aspects of the disclosure, the HARQ feedback echo 1012 may be encoded as a separate code block in the data. In one example, the ACK/NACK data may be encoded with Reed-Muller code and have a front-loaded placement such that the receiver can decode the echo data early in a slot. The front-loaded placement enables the receiver to first decode the retransmission indication so that it can easily identify and process the retransmitted data (e.g., CBs or CBGs).

In some aspects of the disclosure, the transmitter may use ACK/NACK data that is different from the received ACK/NACK data, to generate the HARQ retransmission. In one example, the transmitter may not retransmit some CBs of a NACK'ed CBG. This situation may occur if the CBs can be recovered and/or corrected by an outer code or forward correcting code, if the payload have expired and no longer needed, or if the transmitter does not have available resources to transmit all NACK'ed CBs in the current slot. In such a case, the retransmission indication may be comprised of the ACK/NACK data that was used by the transmitter to generate the retransmission. In this manner, the receiver can correctly identify the retransmitted CBs by combining the retransmission indication with the predetermined rules used to generate the retransmission.

In some aspects of the disclosure, the transmitter may use a retransmission indication mechanism that identifies the retransmitted CBGs in a way that is different from the ACK/NACK feedback scheme used by the receiver. For example, the transmitter may use a different CB grouping or CBG definition for indicating the retransmission as compared to that used by the receiver for sending ACK/NACK data or HARQ feedback.

Figure 12:
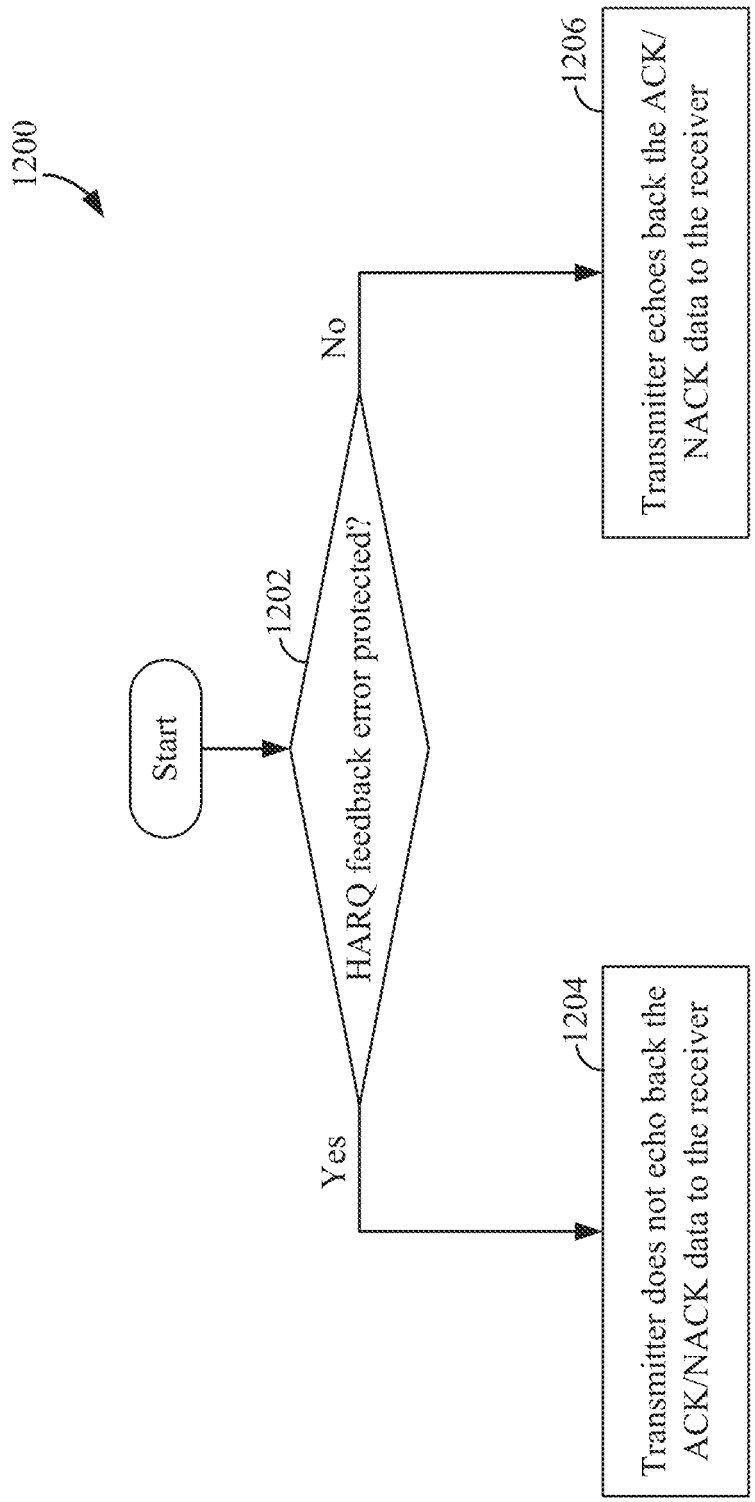
FIG. 12 is a diagram illustrating a HARQ feedback echo process according to one aspect of the disclosure.

FIG. 12 is a diagram illustrating a HARQ feedback echo process 1200 based on the reliability of the HARQ feedback transmission format according to one aspect of the disclosure. The transmitter can configure a retransmission indication based on the reliability of the HARQ feedback (e.g., ACK/NACK) transmission format. At decision block 1202, the transmitter determines whether or not the HARQ feedback is protected by an error detecting code (e.g., CRC protected). At block 1204, if the HARQ feedback is error protected, the transmitter does not echo back the ACK/NACK data to the receiver to ensure reliability. It is because any bit corruption of the HARQ feedback can be easily detected by the transmitter using an error correction process. In a DL example, the HARQ feedback may be carried in a PUCCH that is CRC protected. At block 1206, if the HARQ feedback is not error protected, the transmitter echoes back the ACK/NACK data to the receiver to ensure reliability.

In some aspects of the disclosure, for DL data and UL HARQ feedback, the transmitter may transmit a retransmission indicator (e.g., reTx indication) to indicate the retransmitted CBs in one or more downlink control information (DCI). In one example, if the reTx indication is small in size (e.g., below a predetermined threshold), then the transmitter may use a single DCI in a PDCCH to convey the reTx indication. In another example, if reTx indication is large in size (e.g., above a predetermined threshold), then the transmitter may transmit the reTx indication in a first DCI and a second DCI that may be offloaded to a data channel (e.g., PDSCH).

In some aspects of the disclosure, for UL data and DL HARQ feedback, the DL control information indicates the ACK/NACK for received UL data. The HARQ feedback may use 1-bit per TB or 1-bit per CBG. In some examples, the DL control (e.g., grant) may also specify the HARQ process index and/or new data indicator (NDI) bit for controlling the UL retransmission. The UE may transmit the retransmission indication (e.g., echo of the ACK/NACK data) as part of uplink control information (UCI), which may be in a PUCCH or PUSCH depending on the size of the retransmission indication.

In some aspects of the disclosure, for semi-persistent scheduling devices, the HARQ feedback and retransmission indication scheme may be different from that used for dynamic scheduling cases. In semi-persistent scheduling, modulation order may be limited. Therefore, to simplify HARQ feedback and retransmission, the HARQ feedback and retransmission scheme may be limited to one CB or at most one CBG.

Figure 13:
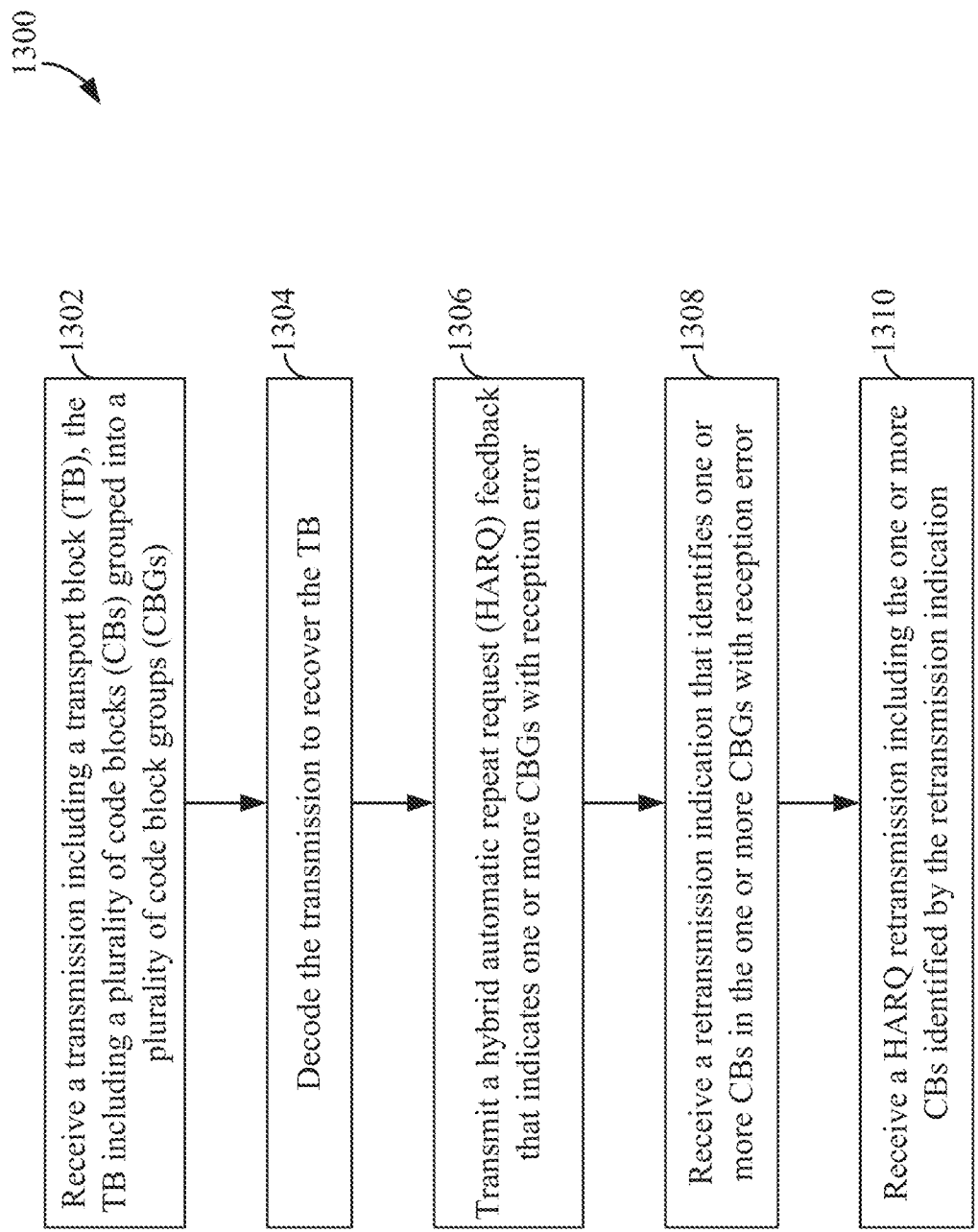
FIG. 13 is a flow chart illustrating an exemplary HARQ retransmission process operable at a receiver according to some aspects of the disclosure.

FIG. 13 is a flow chart illustrating an exemplary HARQ retransmission process 1300 operable at a receiver according to some aspects of the disclosure. In some examples, the process 1300 may be carried out by the scheduling entity or scheduled entity illustrated in FIGS. 1, 2, 6, 7, 9, and/or 10. In some examples, the process 1300 may be carried out by any suitable apparatus or means for carrying out the functions, procedures, processes, or algorithm described below.

At block 1302, a receiver receives a transmission including a transport block (TB). The TB includes a plurality of CBs that are grouped into a plurality of CBGs. In one example, the receiver may use the communication circuit 642/742 to receive the TB (e.g., TB 906/1006) from a transmitter. At block 1304, the receiver decodes the transmission to recover the TB. For example, the receiver may use the processing circuit 640/740 to decode the transmission to receiver the TB. At block 1306, the receiver transmits a HARQ feedback that indicates one or more CBGs with reception error. For example, the receiver may use the HARQ circuit 644/744 to generate the HARQ feedback (e.g., ACK/NACK) and transmit the HARQ feedback using the communication circuit 642/742.

At block 1308, the receiver uses the communication circuit 642/742 to receive a retransmission indication that identifies one or more CBs in the one or more CBGs with reception error. For example, the retransmission indication may be the same as those described above in relation to FIGS. 9 and 10. The retransmission indication can implicitly or explicitly indicate which part of a TB, CBG(s), or CB(s)

is/are being retransmitted. At block 1310, the receiver uses the communication circuit 642/742 to receive a HARQ retransmission including the one or more CBs identified by the retransmission indication.

In one configuration, the apparatus 600 and/or 700 for wireless communication includes means for various HARQ retransmission processes described in relation to FIGS. 8-13. In one aspect, the aforementioned means may be the processor(s) 604/704 shown in FIG. 6/7 configured to perform the functions recited by the aforementioned means. In another aspect, the aforementioned means may be a circuit or any apparatus configured to perform the functions recited by the aforementioned means.

Figure 9:
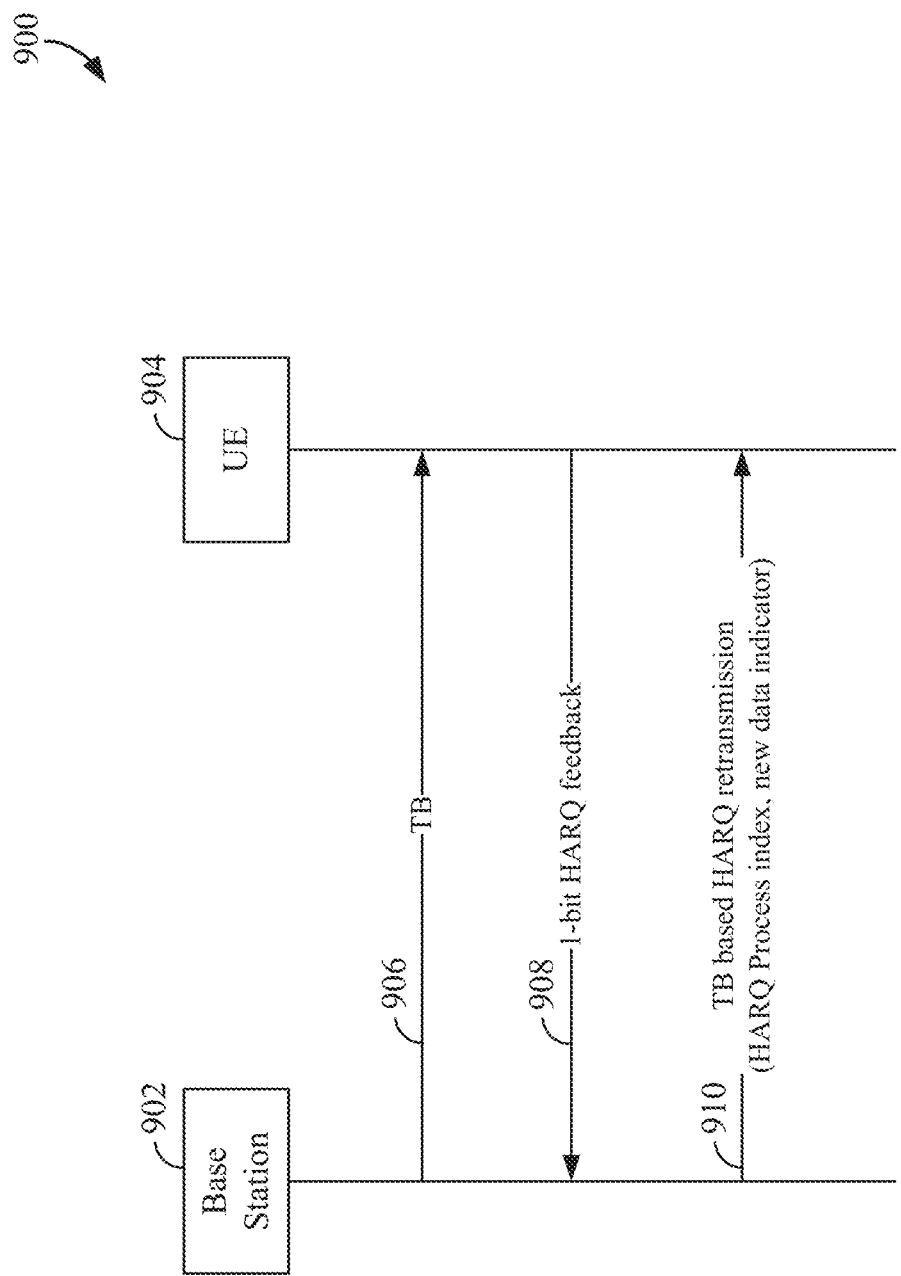
FIG. 9 is a diagram illustrating an exemplary HARQ retransmission process using single bit HARQ feedback according to some aspects of the disclosure.
Figure 10:
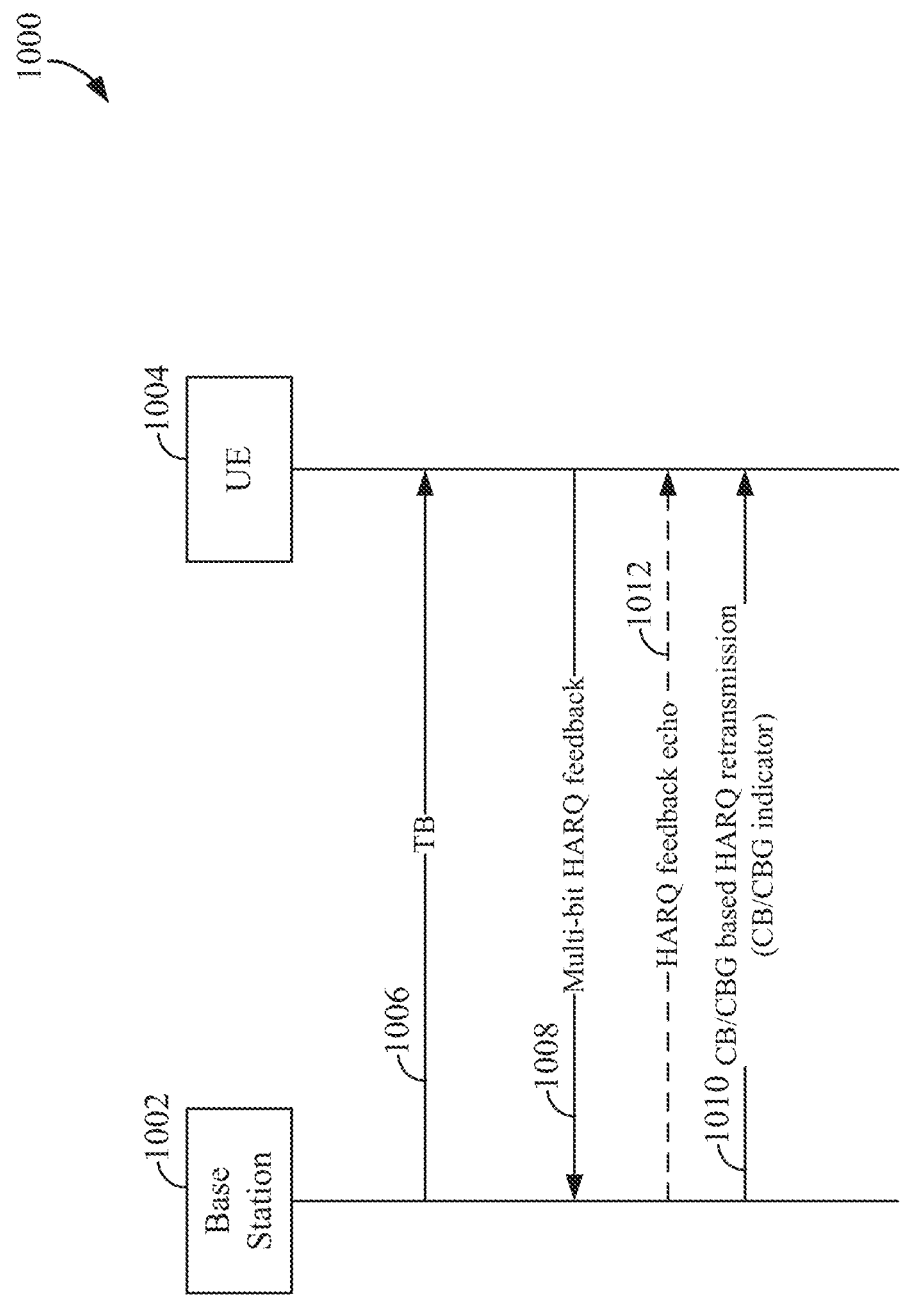
FIG. 10 is a diagram illustrating an exemplary HARQ retransmission process using multi-bit HARQ feedback according to some aspects of the disclosure.

Of course, in the above examples, the circuitry included in the processor 604/704 is merely provided as an example, and other means for carrying out the described functions may be included within various aspects of the present disclosure, including but not limited to the instructions stored in the computer-readable storage medium 606/706, or any other suitable apparatus or means described in any one of the FIGS. 1, 2, 9, and/or 10, and utilizing, for example, the processes and/or algorithms described herein in relation to FIGS. 8-13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   transmitting a transport block (TB) to a receiver, the TB comprising a plurality of code blocks (CBs) grouped into a plurality of code block groups (CBGs);
   receiving a hybrid automatic repeat request (HARQ) feedback from the receiver based on a predetermined HARQ feedback scheme, the HARQ feedback configured to indicate a reception error of one or more CBGs of the TB;
   determining a retransmission indication mechanism based on the predetermined HARQ feedback scheme;
   transmitting a retransmission indication to identify one or more of the CBs based on the retransmission indication mechanism, comprising:
      transmitting a first part of the retransmission indication in a control channel; and transmitting a second part of the retransmission indication in a data channel; and
retransmitting the one or more CBs based on the HARQ feedback.

2. The method of claim 1, further comprising:
determining a transmission format of the HARQ feedback; and
if the transmission format utilizes no error correction, transmitting an echo of the HARQ feedback to the receiver.

3. The method of claim 1, wherein the retransmission indication comprises:
an indicator comprising one or more bits, each bit identifying a corresponding one of the retransmitted CBs;
an indicator identifying one or more CBGs comprising the retransmitted CBs; or
an indicator identifying the retransmitted CBs.

4. The method of claim 1, wherein the retransmitting comprises:
retransmitting a subset of the one or more CB s identified by the HARQ feedback for retransmission.

5. The method of claim 1, further comprising:
transmitting the retransmission indication utilizing a compression scheme that is different from a compression scheme of the HARQ feedback.

6. The method of claim 1, further comprising:
transmitting the retransmission indication in downlink control information (DCI) to identify the retransmitted one or more CBs; or
transmitting the retransmission indication in uplink control information (UCI) to identify the retransmitted one or more CBs.

7. The method of claim 1, wherein the determining the retransmission indication mechanism comprises:
determining a first retransmission indication mechanism for dynamic scheduling; and
determining a second retransmission indication mechanism, different from the first retransmission indication mechanism, for semi-persistent scheduling.

8. The method of claim 1, wherein the predetermined HARQ feedback scheme comprises:
a first HARQ feedback scheme for dynamic scheduling; and
a second HARQ feedback scheme, different from the first HARQ feedback scheme, for semi-persistent scheduling.

9. A method of wireless communication, comprising:
receiving a transmission comprising a transport block (TB), the TB comprising a plurality of code blocks (CBs) grouped into a plurality of code block groups (CBGs);
decoding the transmission to recover the TB;
transmitting a hybrid automatic repeat request (HARQ) feedback that indicates one or more CBGs with reception error;
receiving a retransmission indication that identifies one or more CB s in the one or more CBGs with reception error, comprising:
receiving a first part of the retransmission indication in a control channel; and
receiving a second part of the retransmission indication in a data channel; and
receiving a HARQ retransmission comprising the one or more CBs identified by the retransmission indication.

10. The method of claim 9, further comprising:
receiving an echo of the HARQ feedback, the echo confirming information contained in the HARQ feedback.

11. The method of claim 9, wherein the retransmission indication comprises:
an indicator comprising one or more bits, each bit identifying a corresponding one of the retransmitted CBs;
an indicator identifying one or more CBGs comprising the retransmitted CBs; or
an indicator identifying the retransmitted CBs.

12. The method of claim 9 wherein the receiving the HARQ retransmission comprises:
receiving only a subset of the one or more CBs identified by the HARQ feedback.

13. The method of claim 9, wherein the receiving the retransmission indication comprises:
receiving the retransmission indication utilizing a compression scheme that is different from a compression scheme used to transmit the HARQ feedback.

14. An apparatus for wireless communication, comprising:
a communication interface;
a memory; and
a processor operatively coupled with the communication interface and the memory, wherein the processor and the memory are configured to:
transmit, via the communication interface, a transport block (TB) to a receiver, the TB comprising a plurality of code blocks (CBs) grouped into a plurality of code block groups (CBGs);
receive, via the communication interface, a hybrid automatic repeat request (HARQ) feedback from the receiver based on a predetermined HARQ feedback scheme, the HARQ feedback configured to indicate a reception error of one or more CBGs of the TB;
determine a retransmission indication mechanism based on the predetermined HARQ feedback scheme;
transmit, via the communication interface, a retransmission indication to identify one or more of the CBs based on the retransmission indication mechanism, wherein at least a portion of the retransmission indication is transmitted in a data channel, by:
transmitting a first part of the retransmission indication in a control channel; and
transmitting a second part of the retransmission indication in a data channel; and
retransmit, via the communication interface, the one or more CBs based on the HARQ feedback.

15. The apparatus of claim 14, wherein the processor and the memory are further configured to:
determine a transmission format of the HARQ feedback; and
if the transmission format utilizes no error correction, transmit via the communication interface, an echo of the HARQ feedback to the receiver.

16. The apparatus of claim 14, wherein the retransmission indication comprises:
an indicator comprising one or more bits, each bit identifying a corresponding one of the retransmitted CBs;
an indicator identifying one or more CBGs comprising the retransmitted CBs; or
an indicator identifying the retransmitted CBs.

17. The apparatus of claim 14, wherein the processor and the memory are further configured to:
retransmit, via the communication interface, a subset of the one or more CBs identified by the HARQ feedback for retransmission.

18. The apparatus of claim 14, wherein the processor and the memory are further configured to:
   transmit, via the communication interface, the retransmission indication utilizing a compression scheme that is different from a compression scheme of the HARQ feedback.

19. The apparatus of claim 14, wherein the processor and the memory are further configured to:
   transmit, via the communication interface, the retransmission indication in downlink control information (DCI) to identify the retransmitted one or more CBs; or
   transmit, via the communication interface, the retransmission indication in uplink control information (UCI) to identify the retransmitted one or more CBs.

20. The apparatus of claim 14, wherein the processor and the memory are further configured to determine the retransmission indication mechanism by:
   determining a first retransmission indication mechanism for dynamic scheduling; and
   determining a second retransmission indication mechanism, different from the first retransmission indication mechanism, for semi-persistent scheduling.

21. The apparatus of claim 14, wherein the predetermined HARQ feedback scheme comprises:
   a first HARQ feedback scheme for dynamic scheduling; and
   a second HARQ feedback scheme, different from the first HARQ feedback scheme, for semi-persistent scheduling.

22. An apparatus for wireless communication, comprising:
   a communication interface;
   a memory; and
   a processor operatively coupled with the communication interface and the memory, wherein the processor and the memory are configured to:
   receive a transmission comprising a transport block (TB), the TB comprising a plurality of code blocks (CBs) grouped into a plurality of code block groups (CBGs);
   decode the transmission to recover the TB;
   transmit, via the communication interface, a hybrid automatic repeat request (HARQ) feedback that indicates one or more CBGs with reception error;
   receive, via the communication interface, a retransmission indication that identifies one or more CBs in the one or more CBGs with reception error, wherein at least a portion of the retransmission indication is received in a data channel, by:
      receiving a first part of the retransmission indication in a control channel; and
      receiving a second part of the retransmission indication in a data channel; and
   receive, via the communication interface, a HARQ retransmission comprising the one or more CBs identified by the retransmission indication.

23. The apparatus of claim 22, wherein the processor and the memory are further configured to:
   receive, via the communication interface, an echo of the HARQ feedback, the echo confirming information contained in the HARQ feedback.

24. The apparatus of claim 22, wherein the retransmission indication comprises:
   an indicator comprising one or more bits, each bit identifying a corresponding one of the retransmitted CBs;
   an indicator identifying one or more CBGs comprising the retransmitted CBs; or
   an indicator identifying the retransmitted CBs.

25. The apparatus of claim 22 wherein the processor and the memory are configured to receive the HARQ retransmission by:
   receiving, via the communication interface, only a subset of the one or more CBs identified by the HARQ feedback.

26. The apparatus of claim 22, wherein the processor and the memory are further configured to:
   receive, via the communication interface, the retransmission indication utilizing a compression scheme that is different from a compression scheme used to transmit the HARQ feedback.

* * * * *